(No Model.) 2 Sheets—Sheet 1.

E. WRIGHT.
AUTOMATIC PUMP FOR PNEUMATIC TIRES.

No. 596,952. Patented Jan. 4, 1898.

Witnesses.

Inventor.
Edwin Wright.
By James L. Norris.
Atty.

(No Model.) 2 Sheets—Sheet 2.
E. WRIGHT.
AUTOMATIC PUMP FOR PNEUMATIC TIRES.
No. 596,952. Patented Jan. 4, 1898.
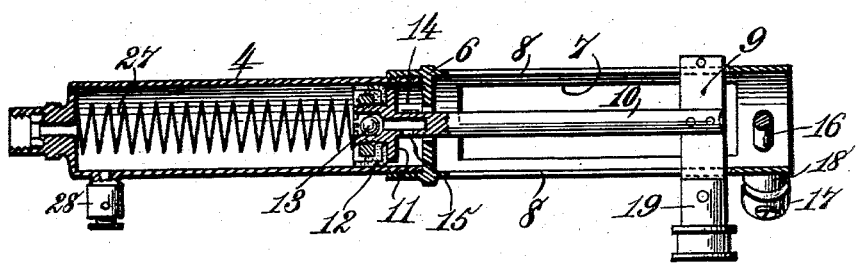
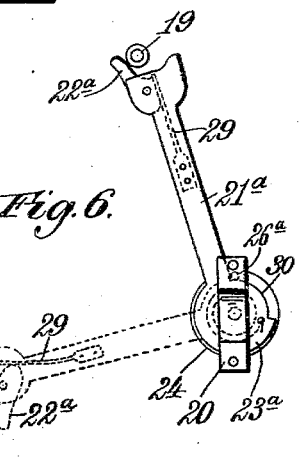
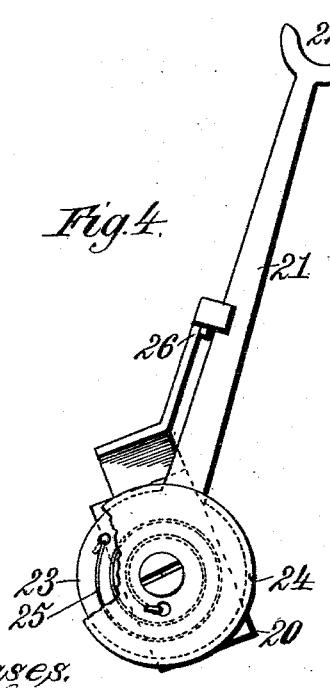
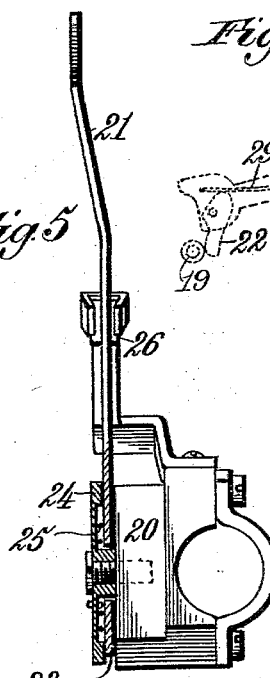

UNITED STATES PATENT OFFICE.

EDWIN WRIGHT, OF STAUNTON, VIRGINIA, ASSIGNOR OF ONE-HALF TO WILLIAM S. BURKE AND JAMES L. BECK, OF SAME PLACE.

AUTOMATIC PUMP FOR PNEUMATIC TIRES.

SPECIFICATION forming part of Letters Patent No. 596,952, dated January 4, 1898.

Application filed September 23, 1897. Serial No. 652,780. (No model.)

*To all whom it may concern:*

Be it known that I, EDWIN WRIGHT, a citizen of the United States, residing at Staunton, in the county of Augusta and State of Virginia, have invented new and useful Improvements in Automatic Pumps for Pneumatic Tires, of which the following is a specification.

This invention relates to automatic pumps for pneumatic tires, and has for its object to provide improved means for the operation of an air-pump that is attached to and carried by the pneumatically-tired wheel of a bicycle or other vehicle, so that the tire may be kept inflated by the forward movement of the wheel regardless of the escape of air by puncture or other accident.

The invention consists in features of construction and novel combinations of the parts of mechanism for automatic inflation of tires, as hereinafter described and claimed.

Figure 1:
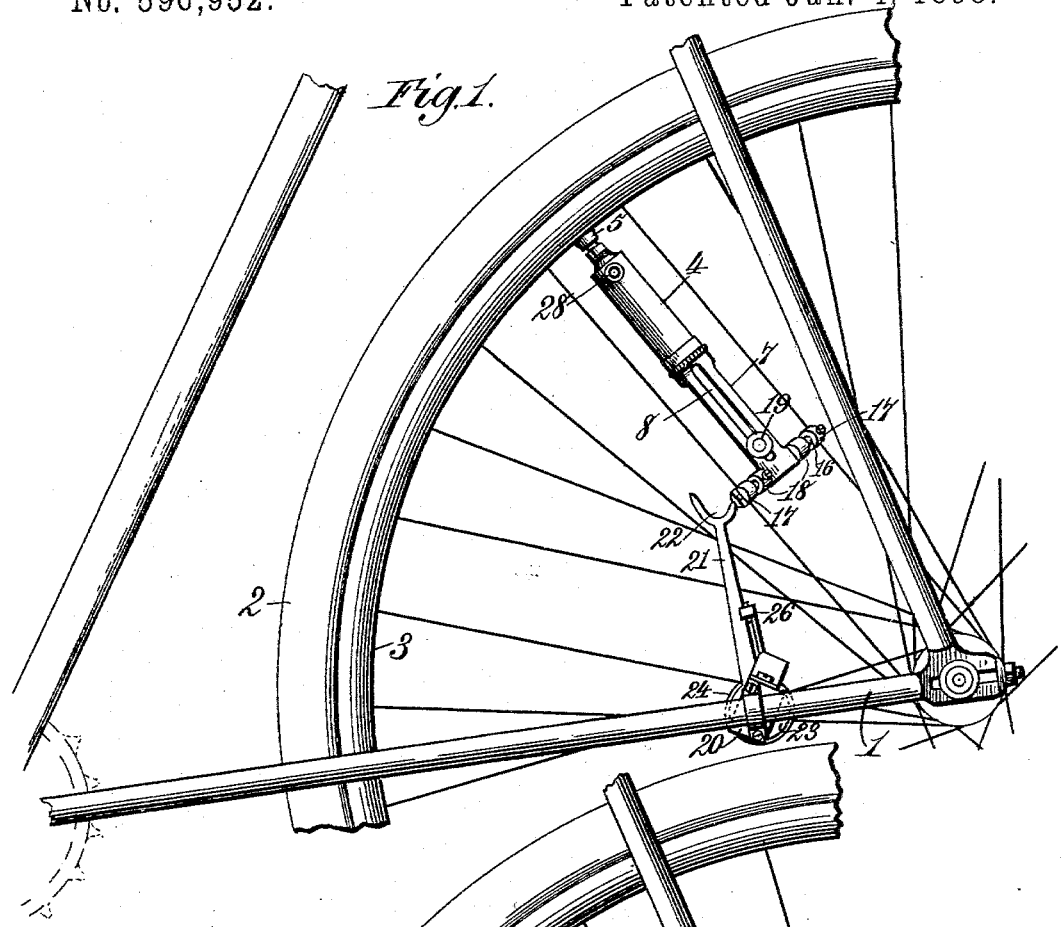
Figure 2:
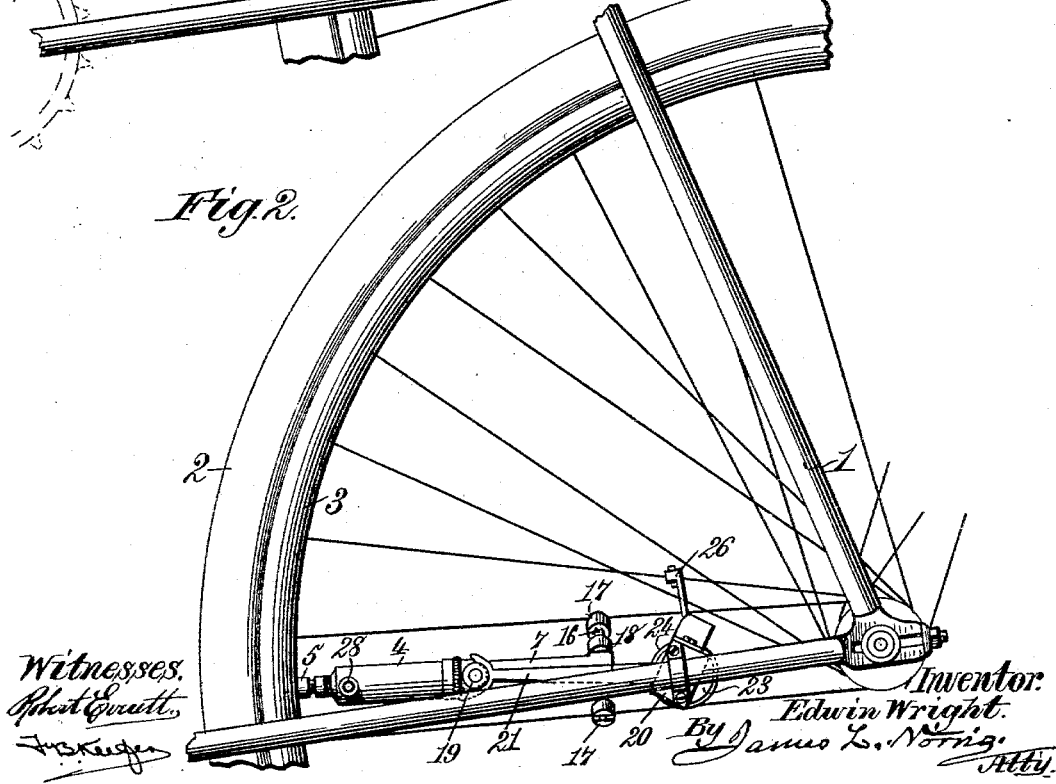

In the annexed drawings, Figure 1 is a view of the rear wheel of a bicycle fitted with an automatic tire-inflating pump and improved mechanism for actuating the pump-piston as the pump revolves with the wheel, the parts of the actuating mechanism being shown as just about to engage. Fig. 2 is a similar view showing the relative position of parts as the pump-piston is about at the end of the tire-inflating stroke. Fig. 3 is an enlarged sectional detail view of the air-pump. Fig. 4 is an enlarged view of the pump-actuating lever from its rear side. Fig. 5 is a part cross-sectional view of said lever mechanism. Fig. 6 illustrates a modification in the construction of the pump-lever.

The reference-numeral 1 designates a rear portion of the frame of a bicycle, and 2 is a pneumatic tire on the rim 3 of the rear wheel.

The tire-inflating pump comprises a cylinder 4, that is secured at one end to the usual valve-nipple 5 on the wheel-rim and through which air is forced into the tire. On the other end of the pump-cylinder 4 there is screwed a cap 6, that is formed integral with a tubular guide-frame 7, in opposite sides of which are provided two longitudinally - arranged guide-slots 8 for a cross-head 9, secured to the rod 10 of the pump-piston. The piston-head 11 may be of any suitable construction and is preferably surrounded with a packing 12, of rubber, leather, or the like. An air-inlet valve 13 is provided in the piston-head, preferably at the inner end of the piston-rod 10, which may be tubular, or in part so, to afford an inlet air-passage to said valve. The passage of air from the pump-cylinder into the tire is controlled by the usual valve on the wheel-rim. The piston-rod 10 may pass loosely through a circular aperture in the cap 6, between which and the piston-head 11 there may be left a sufficient space or chamber 14 from which air can pass into an aperture 15 in the tubular portion of the piston-rod and thence to the air-inlet valve 13 of the pump-cylinder.

Through the outer portion of the tubular guide-frame 7 there is extended a rod 16 of sufficient length to span the space between two adjacent wheel-spokes, to which the ends of the said rod 16 are adjustably secured by means of clamps 17 of any suitable construction. There may be adjustably secured to the rod 16 two collars 18, one at each side of the guide-frame 7 and in contact therewith, so that by loosening these collars the rod 16 may be shifted lengthwise and made to project more or less at either side of the guide-frame 7 or equally from both sides thereof, according to the position in which the pump is to be attached to the diagonally-disposed spokes of the wheel.

On one end of the piston-rod cross-head 9 there is a stud 19, that projects laterally beyond the tubular slotted guide-frame 7, in which the said cross-head works.

To a convenient portion of the bicycle-frame there is clamped a bearing 20, to which is fulcrumed one end of a lever-arm 21, the other end of which is provided with a bifurcation 22 to receive the stud 19 on the cross-head of the pump piston-rod. The pivotal end of the lever 21 is preferably formed with a disk 23, that is arranged between one side of the bearing-block 20 and a disk 24, that is secured to said block. Between and attached to the disks 23 and 24 there is a spring 25, that serves to normally hold the lever 21 in a substantially upright position, as shown in Fig. 1.

In each forward revolution of the pneumatically-tired wheel the air-pump will be carried to such position as will cause the stud 19 of the piston-rod cross-head to engage in the bifurcation 22 of the lever 21 and remain engaged therewith during a part of the revolution of the wheel. Thus as the wheel continues to revolve in a forward direction the stud 19 will carry the lever 21 partly around, as shown in Fig. 2, and the consequent extension of lever-radius will cause the lever to act on the piston-rod of the air-pump, through the stud 19 and cross-head 9, so as to impart to the pump-piston an exhaust stroke for forcing air from the pump-cylinder into the pneumatic tire. A sufficient further revolution of the vehicle-wheel will cause disengagement of the stud 19 from the bifurcated end of the lever 21, whereupon the action of the spring 25 will return the said lever to its normal position, in readiness for further operation of the pump as the wheel approaches the end of another revolution. On the bearing 20 there is supported a suitable stop or buffer 26 to limit the recoil of the lever 21 without shock or injury.

With the rear wheel of a bicycle it is preferable to support the lever 21 from one of the wheel-braces constituting part of the bicycle-frame; but for use with the forward wheel the said lever may be supported from one of the forks of the steering-head.

In the pump-cylinder 4 there is a coiled spring 27, that actuates the piston on its return stroke for taking air into the cylinder as the stud 19 is relieved from the pressure of its actuating-lever. Thus on each revolution of the vehicle-wheel the air-pump will be automatically operated to throw air into the pneumatic tire for maintaining it in an inflated condition. Even should the tire be punctured the automatic pump will supply air as fast as or faster than it can escape through the puncture, and so the wheel can be safely used until there is a convenient opportunity for repairing the punctured tire. An adjustable relief-valve 28 of any suitable construction is preferably provided on the pump-cylinder 4 to permit the escape of any excess of air-pressure from the pump when the tire is properly inflated.

This automatic air-pump mechanism can be conveniently attached to the forward and rear wheels of bicycles and to the pneumatically-tired wheels of velocipedes and other vehicles, and besides rendering unnecessary the employment of an ordinary pump it will keep the tire inflated even though punctured. Obviously the tire may be inflated by simply revolving the wheel before the rider mounts, and the running of the wheels while in use will keep the tires in a proper state of inflation.

Owing to the usual staggered or diagonal arrangement of the spokes in a bicycle-wheel the pump-attaching rod 16 should be arranged somewhat diagonal to the cross-head 9 of the pump-piston, so that the stud 19 will have proper relation to the actuating-lever 21, and it is preferable to make the forward arm of the lever bifurcation 22 somewhat longer than the rear arm to facilitate engagement of the cross-head stud 19 in said bifurcation.

In Fig. 6 there is shown a pump-actuating lever 21$^a$ of modified construction. This lever 21$^a$ may be mounted in the manner already described with reference to the lever 21, but it is shown as provided at its outer end with a pivotal finger 22$^a$ to be engaged by the stud 19 of the piston-rod cross-head. The said pivotal finger 22$^a$ is normally held in an operative position by means of a spring 29, carried on the lever. The inner or pivotal end of the lever 21$^a$ is formed with a disk 23$^a$, having a segmental recess 30 in its edge the shouldered ends of which are adapted to engage a stop or buffer 26$^a$ to limit the movements of the lever 21$^a$ in both directions. When the cross-head stud 19 engages the finger 22$^a$, the spring 29 will hold said finger with sufficient force to cause the lever 21$^a$ to turn with the vehicle-wheel and attached pump until the shoulder at one end of the recess 30 comes into engagement with the stop 26$^a$, and then the pivotal finger 22$^a$ will release the stud 19, the pump-piston having been meanwhile operated.

What I claim as my invention is—

1. The combination with a wheel having a pneumatic tire, and an air-pump adapted to revolve with said wheel and having its piston-rod provided with a laterally-projecting stud, of a lever fulcrumed independent of the pump-support and having one end adapted to be engaged by said stud during a portion of the revolution of the wheel to actuate the air-pump automatically, and a spring to return said lever to normal position on disengagement of the stud therefrom, substantially as described.

2. The combination with a wheel having a pneumatic tire, and an air-pump attached to and carried by said wheel and having its piston-rod provided with a laterally-projecting stud, of a lever fulcrumed independent of the pump-support and having one end adapted to be engaged by said stud during a portion of the revolution of the wheel to actuate the air-pump automatically, a spring to return said lever to normal position on disengagement of the stud therefrom, and a stop to limit the recoil of said lever, substantially as described.

3. The combination with a wheel having a pneumatic tire, and an air-pump supported on and carried by said wheel, of a tubular guide attached to one end of the air-pump cylinder and having guide-slots for a cross-head on the piston-rod, a stud on said cross-head, a lever fulcrumed independent of the pump-support and adapted to be engaged by said stud during a portion of the revolution of the wheel to actuate the air-pump automatically, and a spring to return said lever to normal position on disengagement of the stud therefrom, substantially as described.

4. The combination with a wheel having a pneumatic tire, and an air-pump adapted and arranged to revolve with said wheel, of a tubular and longitudinally-slotted guide attached to one end of the air-pump cylinder, a rod adjustably attached to said guide and adjustably connected with spokes of the wheel, a piston-rod cross-head engaged in slots of the said guide, a stud on said cross-head, a lever fulcrumed independent of the pump-support and having one end to be engaged by said stud during a portion of the revolution of the wheel to actuate the air-pump automatically, a spring to return said lever to normal position on disengagement of the stud therefrom, and a stud to limit the recoil of said lever, substantially as described.

In testimony whereof I have hereunto set my hand in presence of two subscribing witnesses.

EDWIN WRIGHT.

Witnesses:
CHAS. K. HOGE,
D. H. NAILL.